(12) United States Patent
Ostiguy et al.

(10) Patent No.: US 9,047,669 B1
(45) Date of Patent: Jun. 2, 2015

(54) BIT RATE CONTROL FOR DATA COMPRESSION

(71) Applicant: MATROX GRAPHICS INC., Dorval (CA)

(72) Inventors: Jean-Jacques Ostiguy, Montreal (CA); Nicolas Jean, Laval (CA); Simon Garneau, Coteau-du-Lac (CA); Alain Champenois, Montreal (CA); Mathieu Girard, Sainte-Marthe-sur-le-Lac (CA)

(73) Assignee: MATROX GRAPHICS INC., Dorval, Quebec (CA)

( * ) Notice: Subject to any disclaimer, the term of this patent is extended or adjusted under 35 U.S.C. 154(b) by 357 days.

(21) Appl. No.: 13/623,557

(22) Filed: Sep. 20, 2012

Related U.S. Application Data

(60) Provisional application No. 61/625,995, filed on Apr. 18, 2014.

(51) Int. Cl.
| | |
|---|---|
| G06K 9/36 | (2006.01) |
| G06K 9/46 | (2006.01) |
| G06T 9/00 | (2006.01) |

(52) U.S. Cl.
CPC ................................ G06T 9/005 (2013.01)

(58) Field of Classification Search
USPC ................ 382/233, 234, 238, 239, 248, 251; 375/240.02, 240.03, 240.18, 240.24
See application file for complete search history.

(56) References Cited

U.S. PATENT DOCUMENTS

| | | | | |
|---|---|---|---|---|
| 6,912,255 B2 * | 6/2005 | Drezner et al. | ............ | 375/240.2 |
| 8,189,668 B2 | 5/2012 | Hong et al. | | |
| 8,526,488 B2 * | 9/2013 | Zheludkov et al. | ........... | 375/240 |
| 8,635,357 B2 * | 1/2014 | Ebersviller | ................... | 709/231 |

OTHER PUBLICATIONS

Reibman et al., "Constrainst on Variable Bit-Rate Video for ATM Networks", IEEE Transactions on Circuits and Systems for Video Technology, vol. 2, No. 4, pp. 361-372, Dec. 1992.

Richardson, "H.264 and MPEG-4 Video Compressions: Video Coding for Next-generation Mulimedia", Chapter 6, "H.264/MPEG4 Part10", pp. 159-223, 2003.

Ghandi et al., "A Lagrangian Optimized Rate Control Algorithm for the H.264/AVC Encoder", International Conference on Image Processing 2004, vol. 1, pp. 123-126, Oct. 2004.

Ma et al., "Rate-Distortion Analysis for H.264/AVC Video Coding and its application to Rate Control", IEEE Transactions on Circuits and Systems for Video Technology, vol. 15, No. 12, pp. 1533-1544, Dec. 2005.

Yi et al., "Improved H.264 Rate Control by Enhanced MAD-Based Frame Complexity Prediction", Journal of Visual Communication and Image Representation (Special Issue on Emerging H.264/AVC Video Coding Standard), Elsevier Science, pp. 1-14, May 2005.

Li et al., "Adaptive Rate Control for H.264", Journal of Visual Communication and Image Representation, vol. 17, pp. 376-406, 2006.

(Continued)

*Primary Examiner* — Phuoc Tran
(74) *Attorney, Agent, or Firm* — Norton Rose Fulbright Canada LLP

(57) ABSTRACT

There is described herein a method and system for dynamically controlling the bit rate of a codec during image data compression by analyzing information output by a first module that processes the group of macroblocks as part of the compression scheme, and configuring a second module to process the group of macroblocks according to this analysis.

19 Claims, 8 Drawing Sheets

(56) References Cited

OTHER PUBLICATIONS

Kwon et al., "A Novel Two-Stage Rate Control Scheme for H.264", IEEE International Conference on Multimedia and Expo 2006, pp. 673-676, Jul. 2006.

Kwon et al., "Rate Control for H.264 Video With Enhanced Rate and Distortion Models" IEEE transaxtions on Circuits and Systems for Video Technology, vol. 17, No. 5, pp. 517-529, May 2007.

Merritt et al., "Improved Rate Control and Motion Estimation for H.264 Encoder", IEEE International Conference on Image Processing 2007, vol. 5, pp. V309-V312, Oct. 2007.

He et al., "Linear Rate Control and Optimum Statistical Multiplexing for H.264 Video Broadcast", IEEE Transactions on Multimedia, vol. 10, No. 7, pp. 1237-1249, Nov. 2008.

Milani et al., "A Rate Control Algorithm for the H.264 Encoder", Dept. of Information Engineering, University of Padova, Italy, 6 pages.

* cited by examiner

BIT RATE CONTROL FOR DATA COMPRESSION

CROSS-REFERENCE TO RELATED APPLICATIONS

The present application claims priority under 35 U.S.C. §119(e) of U.S. Provisional Patent Application No. 61/625,995 filed on Apr. 18, 2012, the contents of which are hereby incorporated by reference.

TECHNICAL FIELD

The present invention relates to the field of image data compression and decompression.

BACKGROUND OF THE ART

Applications that use image data are found in many different fields, such as security control, television, broadcasting, social media, video telephony, videoconferencing, wireless devices, streaming media applications, remote desktop, cloud computing, and others. Image data may refer to video data, computer generated graphics data, desktop data, or any other type of data depicting a visual perception. Image data may be stored in a variety of medium (DVDs, Blu-Ray disks, mobile devices, memory sticks, hard-drive, etc) and may be transmitted through a variety of medium such as fiber optics, IP connections, USB, satellite, etc.

Image compression and decompression are performed to reduce the consumption of expensive resources, such as storage space or transmission bandwidth. In general, a codec (encoder/decoder) includes an encoder used to convert the source data into a compressed form occupying a reduced space prior to storage or transmission. The codec may also comprise a decoder which receives compressed data and converts it into a decompressed image or stream ready for display or for further processing. The codec may be a software implementation, a hardware implementation, or a combination thereof.

Compression efficiency of encoders is typically defined by the bit rate and the image quality of the decompressed video stream. In many applications, it is desirable to have a constant or substantially constant bit rate while maintaining a good quality image. This is particularly challenging for image data that has a high variability in content from picture to picture and/or within the same picture. Therefore there is a need for a method and system for compressing image data at a controlled bit rate.

SUMMARY

There is described herein a method and system for dynamically controlling the bit rate of a codec during image data compression by analyzing information output by a first module that processes the group of macroblocks as part of the compression scheme, and configuring a second module to process the group of macroblocks according to this analysis.

In accordance with a first broad aspect, there is provided a method for compressing a data stream with a compression device comprising at least a first and a second module. A request to compress a group of macroblocks of the data stream is received. The first module is configured in accordance with initial compression parameters and the first module is asked to process the group of macroblocks. An output of the first module comprising information related to the group of macroblocks as processed by the first module is received. Upon analyzing the information related to the group of macroblocks and determining updated compression parameters in accordance therewith, the second module is configured with the updated compression parameters and the second module is asked to process the group of macroblocks when the analysis of the information related to the group of macroblocks meets the selection criteria.

In accordance with another broad aspect, there is provided a compression device for compressing a data stream comprising a first module for performing a first part of a compression scheme, a second module for performing a second part of the compression scheme, and a control module operatively connected to the first module and the second module. The control module is adapted for receiving a request to compress a group of macroblocks of the data stream; configuring the first module in accordance with initial compression parameters and requesting that the first module process the group of macroblocks; receiving an output of the first module comprising information related to the group of macroblocks as processed by the first module; analyzing the information related to the group of macroblocks and determining updated compression parameters in accordance therewith; and configuring the second module with the updated compression parameters and requesting that the second module process the group of macroblocks when the analysis of the information related to the group of macroblocks meets the selection criteria.

In this specification, the term "macroblock" is intended to mean a partition of a picture representing image data. For example, a macroblock may correspond to a 16×16 sample region of a picture (16×16 luma samples, 8×8 Cb and 8×8 Cr samples). Other partitionings will be readily understood by those skilled in the art. A picture may be coded as one or more portions, each portion containing at least one macroblock up to a plurality of macroblocks or slices. Each slice comprises a group of macroblocks (from 1 to N). A slice may comprise the total number of macroblocks in a picture. The number of macroblocks per slice need not be constant within a picture.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
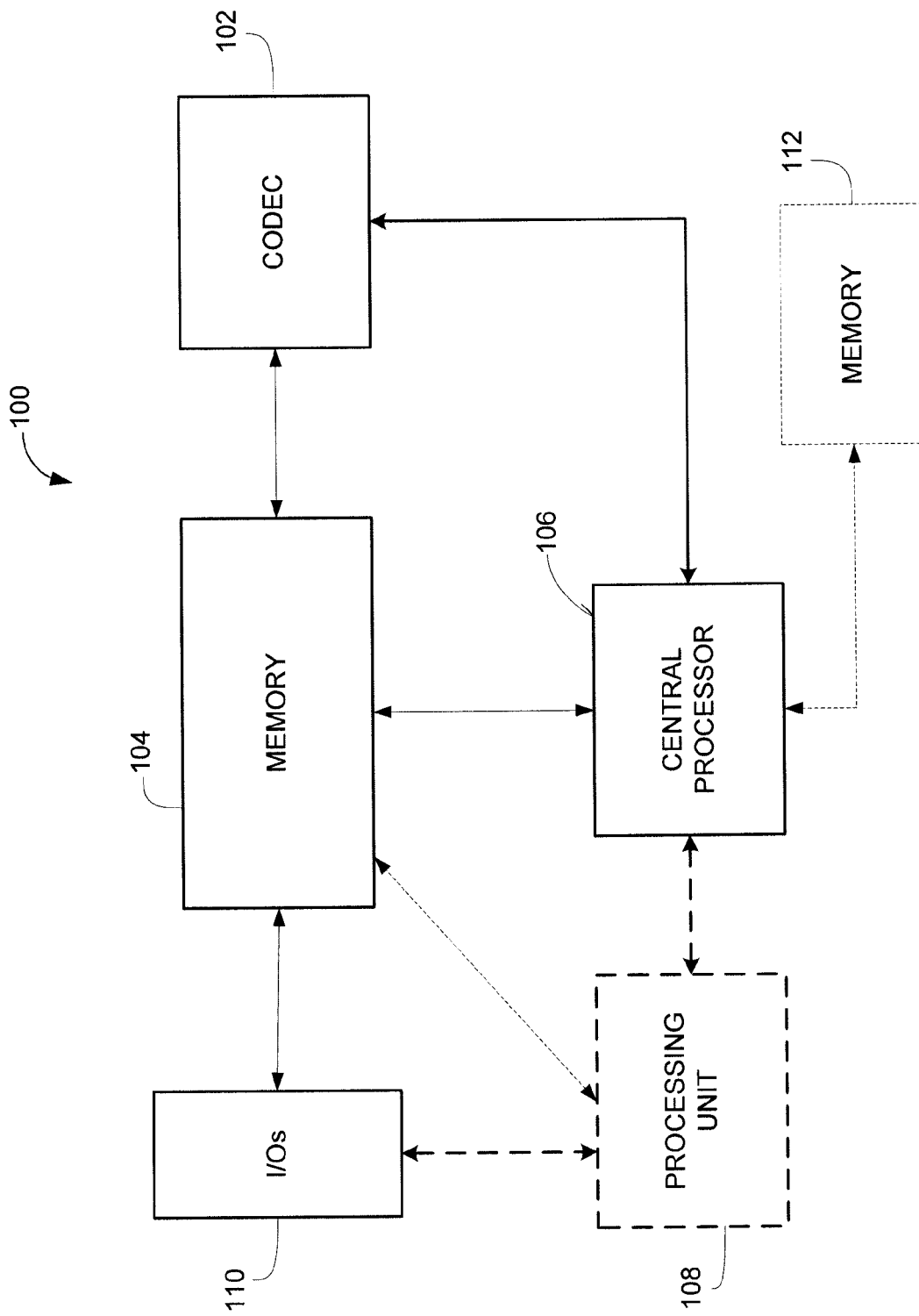
FIG. 1 is a block diagram of an exemplary system comprising a codec.

FIG. 1 illustrates a system 100 comprising a codec 102, a memory 104, and a central processor 106. The memory 104 accessible by the central processor 106 receives and stores data. The memory 104 may be a main memory of the central processor 106, such as a high speed Random Access Memory (RAM), or a local memory. The central processor 106 may access the memory 104 to retrieve data.

In some embodiments, the system 100 may also comprise one or more processing unit 108 connected to the memory 104. This additional processing unit 108 may correspond to a graphics processing unit, a video processing unit, a display engine, an audio processor, or any other type of processing unit known to those skilled in the art. A plurality of input/output interfaces 110 may also be provided to allow the system 100 to receive and transmit data from/to external modules and/or peripheral devices. Also illustrated in FIG. 1 is a second memory 112 connected to the central processor 106.

The components of the system 100 may be packaged in various manners. For example, the central processor 106 and the codec 102 may be included in a System-on-a-chip (SoC). The codec 102 may be included in a chip while the central processor 106 is provided externally to the chip. The memory 104 and the codec 102 may be provided in an SoC or a chip. The codec 102 may be included in an integrated circuit or a chip and the memory 104 may be external to the integrated circuit. The codec 102, the central processor 106, the processing unit 108 and the Input/Output interfaces 110 may be connected to the memory 104 through a memory controller (not shown). The codec 102 may also be located remotely from the central processor 106 with the two components being part of a network.

The image data to be compressed may be stored in memory 104, memory 112 or any other memory operatively connected to codec 102, directly or indirectly. If the image data is stored externally to the system 100, it may be copied into memory 104 or memory 112 before processing, by the codec 102 or by a dedicated module, such as a copy engine (not shown). The image data may correspond to a stream of pictures, a picture, and/or a portion of a picture. A picture may be a frame or a field. In some embodiments, a portion of a picture may correspond to one or more macroblocks. For example, a portion of a picture may be a slice or a plurality of slices.

The codec 102 may use one or more of a number of previously encoded pictures as a reference for motion-compensated prediction of each inter coded macroblock or macroblock partition. This enables the codec 102 to search for the best match for the current macroblock partition from a wider set of pictures than just a previously encoded picture. The codec may thus maintain one or more lists of reference pictures, containing pictures that have previously been encoded and decoded (occurring before and/or after the current picture in display order).

Figure 2:
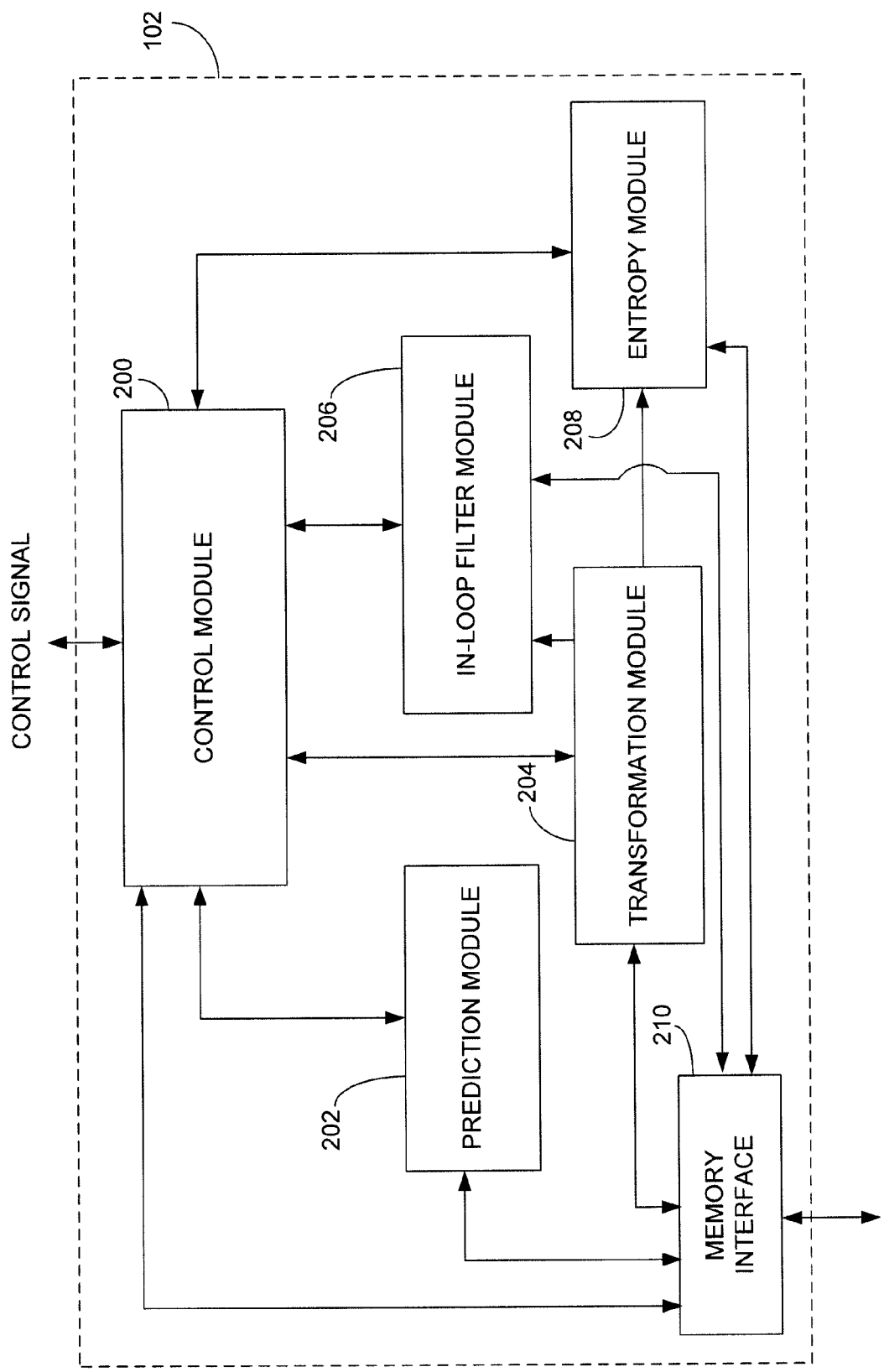
FIG. 2 is a block diagram of an exemplary codec for compressing image data.

FIG. 2 is a block diagram of an exemplary embodiment of the codec 102 for encoding an uncompressed bit stream into a compressed bit stream. In this embodiment, a control module 200 acts as an initial input point for the codec 102. A control signal may be received by the control module 200 in order to trigger compression of the image data. The control signal may be generated by an application running on central processor 106, processing unit 108, or another processing unit operatively connected to codec 102, directly or indirectly. The application may request that an entire stream of pictures, a portion of a stream of pictures, a picture, or a portion of a picture be compressed. In some embodiments, the request for compression may be broken down into a plurality of requests for compressing portions of the stream. The plurality of requests may comprise one or more steps for configuring the codec 102 according to the application's initial request.

The control signal may comprise control information to allow the control module 200 to configure the various modules of the codec 102 with appropriate compression parameters in order to perform the requested task(s) of compressing image data. Configuration may be performed in one or more steps, depending on the initial request and on the format of the request. Compression parameters are initialized from configuration parameters sent by the application. The configuration parameters may be provided to the control module 200 together with the request for compression or separately therefrom. Depending on the task, some of the modules may not need to be configured and may not be used to process data.

A prediction module 202, a transformation module 204, an in-loop filter module 206 and an entropy module 208 are each connected to a memory interface 210 in order to read and write data to memory 104 without passing through the control module 200. In the embodiment illustrated, the memory interface 210 is internal to the codec 102 while the memory 104 is external to the codec 102. In an alternative embodiment, both the memory interface 210 and the memory 104 are external to the codec 102. The transformation module 204 and the entropy module 208 may be connected together in order to pass information directly therebetween. The transformation module 204 may also be connected directly to the in-loop filter module 206. The prediction module 202, transformation module 204, in-loop filter module 206 and entropy module 208 are each connected to the control module 200 for configuration and control of the process.

In general, image data is stored in the memory 104 and requests are sent to the codec 102 to compress the image data. Following the receipt of the compression requests, the control module 200 of the codec 102 configures the prediction module 202 with appropriate parameters for processing the image data stored in memory 104. The prediction module 202 accesses the memory 104 through the memory interface 210, processes image data, and stores the result in the memory 104. In a second step the transformation module 204 is configured with appropriate parameters and retrieves data from the memory 104 in order to process it. In some embodiments data processed by the transformation module 204 is immediately transferred to the in-loop filter module 206 for processing without going through the memory 104. In other embodiments the transformation module 204 processes data and stores it to memory 104 before the in-loop filter module 206 accesses it. According to this embodiment, the in-loop filter module 206 reads the data from the memory 104, processes the data, and stores it back in memory. In a subsequent step, data is read from memory 104 and processed by the entropy module 208. In another embodiment, the entropy module 208 receives data to process directly from the transformation module 204. Once the data is processed in the entropy module 208, it is stored back to memory 104 or alternatively output to an external module.

Figure 3:
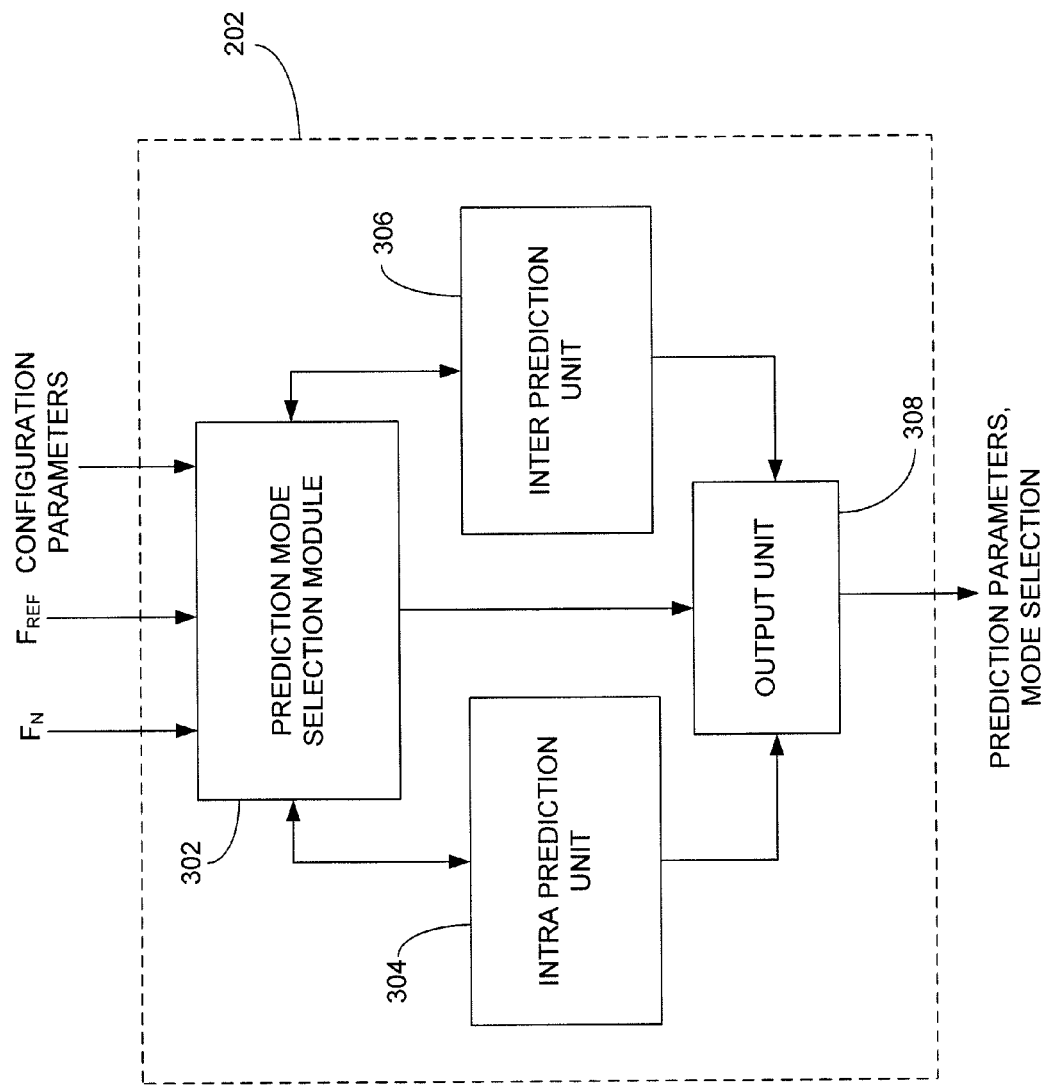
FIG. 3 is a block diagram of an exemplary prediction module of the codec of FIG. 2.

FIG. 3 illustrates an exemplary embodiment for the prediction module 202. A prediction mode selection unit 302 receives configuration parameters, image data $F_N$ and reference pictures $F_{REF}$, and chooses between an intra prediction mode and an inter prediction mode for the compression of the image data. If intra prediction is used, information contained only within the current picture may be used for the prediction. If inter prediction is used, information from a previously encoded picture may be used in the prediction. The selection of the prediction mode is made using a variety of factors, such that a difference between a prediction and the image data is minimized.

The selected mode is sent to an output unit 308. An intra prediction unit 304 is used to generate prediction parameters according to an intra mode, such as the partitioning of the image data. An inter prediction unit 306 is used to generate prediction parameters for an inter mode, such as the partitioning, motion vectors, and selected reference pictures. The prediction parameters from both the intra prediction unit 304 and the inter prediction unit 306 are provided to the output unit 308. In some embodiments, both sets of prediction parameters are output with the mode selection. Alternatively, only the prediction parameters corresponding to the selected mode are output from the prediction module 202. In addition to outputting the prediction parameters and the mode selection, the prediction module 202 outputs information gathered during the processing of the image data in the intra prediction unit 304, in the inter prediction unit 306 and in the prediction mode selection unit 302.

The prediction module 202 may access the memory 104 to read the image data $F_N$ and reference pictures $F_{REF}$. Once the image data has been processed, the resulting prediction parameters and mode selection may be written to memory 104 via memory interface 210.

Figure 4:
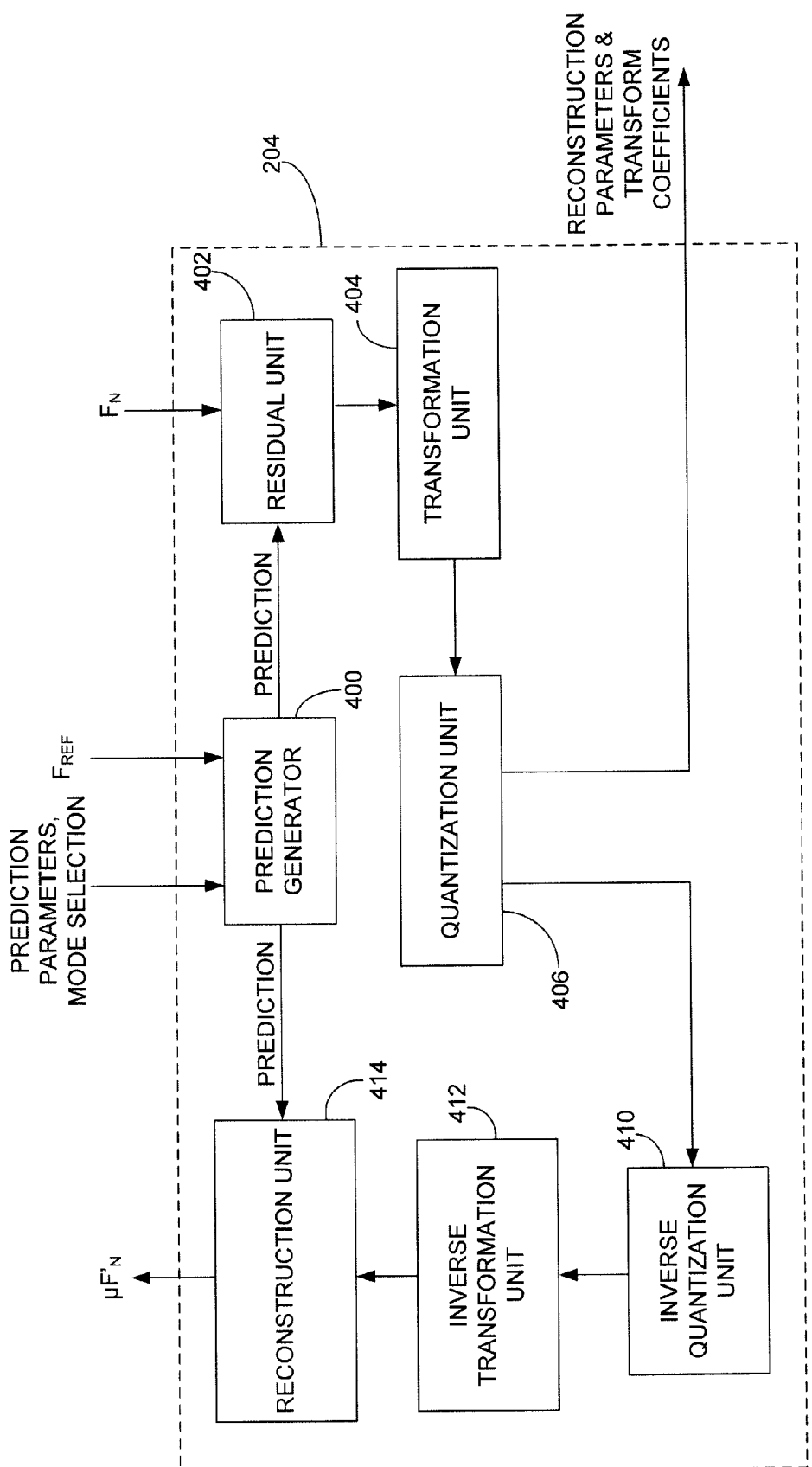
FIG. 4 is a block diagram of an exemplary transformation module of the codec of FIG. 2.

FIG. 4 illustrates an exemplary embodiment of the transformation module 204 for data compression. The prediction parameters, mode selection and reference pictures $F_{REF}$ are read from memory 104 by the transformation module 204 and used by a prediction generator 400 to generate the prediction. The generated prediction is provided to a residual unit 402 and subtracted from the image data $F_N$ in order to generate the residual. The residual is transformed via a transformation unit 404 and quantized via a quantization unit 406 to obtain a set of quantized transform coefficients.

The transformation applied by the transformation unit 404 depends on the standard followed for the compression. For example, under H.264, various transforms are used depending on the type of residual data that is to be coded: a 4×4 or 8×8 DCT-based transform (Discrete Cosine Transform) is performed on luma and chroma coefficients and a Hadamard transform may be performed on DC coefficients in intra macroblocks predicted in 16×16 mode. Under other standards, other transforms may be used, as appropriate. The quantization unit 406 may be a scaler quantizer, as per H.264.

As well as encoding and transmitting the image data, the transformation module 204 may decode, or reconstruct, the encoded image data in order to provide a reference for further predictions. The quantized transform coefficients generated by the quantization unit 406 are scaled ($Q^{-1}$) via an inverse quantization unit 410 and inverse transformed ($T^{-1}$) via an inverse transformation unit 412 to produce a difference block $D_N'$. The prediction generated by the prediction generator 400 is added to the difference block $D_N'$ by a reconstruction unit 414 to create a reconstructed block $\mu F'_N$. The reconstructed block is a decoded and unfiltered version of the original block. The reconstruction block may be written to memory 104 for future use or passed directly to a filtering module such as the in-loop filter module 206. Alternatively, the in-loop filter module 206 may read the reconstruction block from memory 104. In some embodiments, filtering is performed to reduce the effects of blocking distortion and the reconstructed reference picture is created from a series of blocks $F'_N$. In some embodiments, the in-loop filter module 206 is not used in the compression of image data and may not be included in the codec 102.

Figure 5:
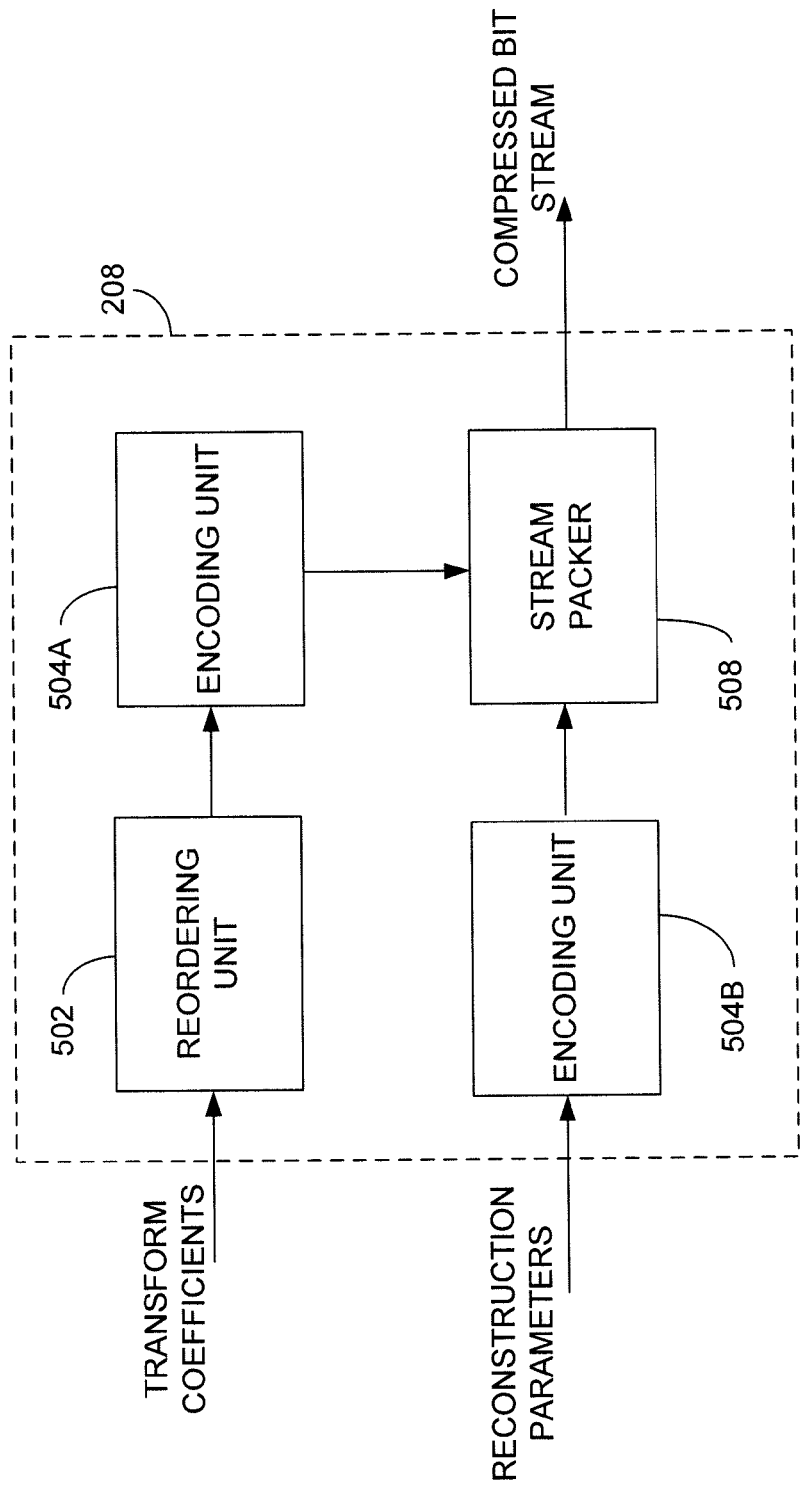
FIG. 5 is a block diagram of an exemplary entropy module of the codec of FIG. 2.

In accordance with some embodiments, the reconstruction parameters and transform coefficients as output by the quantization unit 406 are written to memory 104 for retrieval by the entropy module 208 for entropy coding. Alternatively, the reconstruction parameters and transform coefficients may be provided directly to the entropy module 208. In some embodiments, the reconstruction parameters and transform coefficients are partially lossless encoded in the transformation module 204 and the lossless encoding is completed in the entropy module 208 before the encoded data is output. FIG. 5 is an exemplary embodiment of an entropy module 208. A reordering unit 502 receives the transform coefficients and scans them in a given zig-zag order. Encoding unit 504a performs entropy coding on the reordered transform coefficients using any known entropy coding mappings. For example, this may be done by mapping a 2×2, 4×4, or 8×8 block of quantized transform coefficients to a 4, 16, or 64-element array, respectively. Elements may be encoded using either variable-length codes such as context-adaptive variable length codes (CAVLC) and Exp-Golomb codes, or using context-adaptive arithmetic coding (CABAC), depending on the entropy encoding mode, as per H.264. Other entropy coding compression schemes may also be applicable. Similarly, encoding unit 504b performs entropy coding on the reconstruction parameters using any known entropy coding mappings. Table 1 illustrates examples of parameters to be encoded by encoding unit 504b.

TABLE 1

| Parameters | Description |
| --- | --- |
| Sequence-, picture-and slice-layer syntax elements | Headers and parameters |
| Macroblock type | Prediction method for each coded macroblock |
| Coded block pattern | Indicates which blocks within a macroblock contain coded coefficients |
| Quantizer parameter | Transmitted as a delta value from the previous value of QP |
| Reference frame Reference frame index | Identify reference frame(s) for inter prediction |
| Motion vector | Transmitted as a difference (mvd) from predicted motion vector |

A stream packer 508 generates a compressed bit stream, which may be written to memory 104 or transmitted to another module, internal or external to system 100.

According to some embodiments, the codec 102 may be configured to adapt the configuration of the different modules during the compression of a stream of image data. This is done to control the rate of compression of a stream of data and for providing a substantially constant bit rate. In order to do so, a macroblock or group of macroblocks is partially compressed in a first module in accordance with first compression parameters and further processed in a second module in accordance with updated compression parameters. The updated compression parameters are determined in part on the basis of information output by the first module after the partial compression of the macroblock or group of macroblocks. Alternatively, the first module may reprocess the macroblock or group of macroblocks before it is processed in the second module until the estimated number of bits of the final compressed macroblock or group of macroblocks is consistent with a desired bit rate. In some cases, the updated compression parameters are maintained as is for further use (i.e. identical to the ones used in the first module) while in other cases, the compression parameters are modified.

Figure 6:
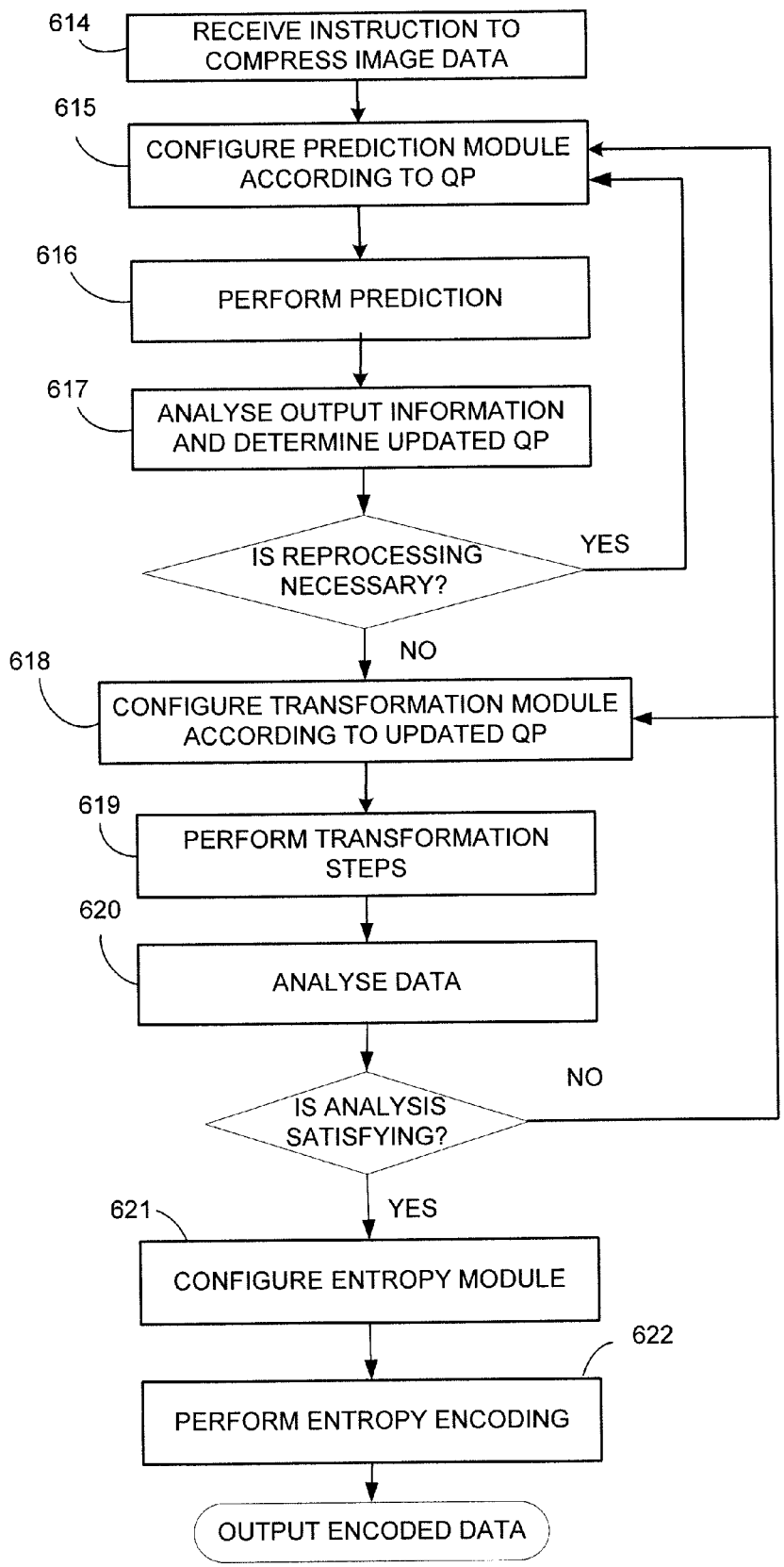
FIG. 6 is a flowchart of an exemplary method for compressing image data using the codec of FIG. 2.

Referring to FIG. 6, at step 614 an application may request compression of image data. According to the compression request and configuration parameters, the codec 102 is configured to compress the image data. Configuration parameters may be general parameters defining how the stream of image data is to be compressed. For example, the configuration parameters may comprise the picture resolution and timings (e.g. pixel format, size, pixel depth, scan mode, frame rate), slice type and size, information relative to the sequence of pictures (e.g. picture hierarchy, Group Of Picture (GOP) structure (I period, P period, Idr period), GOP offset, a target bit rate, allowed drift from the target bit rate, the latency, coding functions and other information delimiting the operational mode of the control module (e.g. rate control mode, Minimum and maximum QP, QP correction tensors, QP offsets, scene detection threshold).

Still at step 614, when operating in a "controlled bit rate" mode, the control module 200 allocates for each GOP of the datastream an associated number of bits. The allocated number of bits represents the number of bits the compressed GOP can have in order for the codec to achieve the target bit rate. Each GOP is comprised of a plurality of pictures. The plurality of pictures may be grouped in subsets of a GOP referred to as subGOPs. A subGOP may be a single picture, a series of B type pictures with the pictures they refer to, or any other combination of pictures belonging to the same GOP. Similarly, the control module 200 distributes the GOP's allocated number of bits to its subGOP and distributes each subGOP's allocated number of bits to the portions of picture comprised in the subGOP. A portion of a picture may comprise at least one macroblocks. The allocated number of bits will allow the control module 200 to keep track of bits used to compress portions of the data stream relative to the number of bits allowed to guarantee a substantially constant bit rate.

At step 615, the control module 200 configures the prediction module 202 with a group of macroblocks, a number of reference pictures, a first set of coefficients representative of a first quantization parameter (qp_1), an encoding mode, and other parameters necessary to process each macroblock. In one embodiment, the control module 200 determines the first set of coefficients representative of qp_1 according to information gathered during the prediction step, the transformation step and the entropy encoding steps of previously encoded groups of macroblocks. In another embodiment, the control module 200 configures the prediction module 202 with a first set of coefficients representative of an initial qp_1 determined by the application or an intermediate module. In yet another embodiment, the group of macroblocks corresponds to the first portion of a stream of pictures to be encoded in the codec and there is no previously encoded data in the system. In this case, the codec may encode the group of macroblocks in a first pass with a first set of coefficients representative of a qp_1 and may analyze data output by the prediction module 202, the transformation module 204 and the entropy module 208 during the processing of the group of macroblocks to determine a second set of coefficients representative of a second quantization parameter qp_2. Alternatively, the codec may encode a plurality of pictures from the data stream with a first set of coefficients representative of a qp_1 and may analyze data output by the prediction module 202, the transformation module 204 and the entropy module 208 during the processing of the group of macroblocks to determine a second set of coefficients representative of a second quantization parameter qp_2. Further, the codec 102 will reprocess the group of macroblocks using the second set of coefficients representative of qp_2.

At step 616, the prediction module 202 performs a prediction for each macroblock of the group of macroblocks. At the end of the processing of the group of macroblocks, the prediction module 202 outputs the prediction results as well as information gathered during this processing. As an example, the information may be a set of statistics which can be used to estimate the distortion of the group of macroblocks and to predict the number of bits necessary to encode the group of macroblocks and/or the subGOP comprising the group of macroblocks. The information may be accessed directly by the control module 200 or stored in memory 104 for access by the control module 200. The information output by the prediction module 202 is related to the group of macroblocks for which the prediction is output and is used by the control module 200 to determine if the group of macroblocks should be reprocessed by the prediction module 202 or not.

In general, the analysis of the information output by the prediction module 202 provides a better estimation of the compression size of the group of macroblocks. This estimation is used to determine an updated quantization parameter. The use of this quantization parameter in the transformation step of the compression of the group of macroblocks will improve the overall quality and distortion during the compression of the stream of image data and achieve a substantially constant bit rate. The updated quantization parameter minimizes the difference between a used number of bits and allocated number of bits for the data stream in order to respect a bit budget consistent with the desired constant bit rate. At step 617, the control module 200 analyses the information output from the prediction module 202 during the processing of the group of macroblocks and determines a second quantization parameter qp_2 for configuration of the transformation module 204. In some embodiments, during the analysis step 617, the control module 200 may determine the second quantization parameter qp_2 with information output by the prediction module 202 further to its processing of the group of macroblocks and also using information from previously encoded groups of macroblocks. Furthermore, information output by the prediction module 202, the transformation module 204 and the entropy module 208 during the processing of previously encoded groups of macroblocks may also be used to determine the second quantization parameter.

If the second quantization parameter qp_2 satisfies selection criteria, the transformation module 204 is configured to process the group of macroblocks according to qp_2, as shown at step 618. In some of these embodiments, qp_2 may be identical to qp_1. In some other embodiments, qp_2 is different from qp_1. In some embodiment, qp_2 satisfies the selection criteria if the variation between qp_2 and qp_1 is within a predetermined interval. In other embodiments, the selection criteria may comprise other criteria such as compression parameters or the slice type.

If the second quantization parameter qp_2 does not satisfy selection criteria, the control module 200 may reconfigure the prediction module 202 with a second set of coefficients representative of the second quantization parameter qp_2 and may request the reprocessing of the group of macroblocks in order to get better prediction for each macroblock. The decision of reprocessing the group of macroblocks depends on the value of qp_2 and additional parameters. In these embodiments, the group of macroblocks is reprocessed according to qp_2 in steps 615, 616 and 617. Further to the second analysis of data output from the prediction module 202, the control module 200 may determine a third quantization parameter qp_3 used to configure the transformation module 204 to process the group of macroblocks. The control module 200 may reprocess the group of macroblocks, with the prediction module 202, N times until the processing result is satisfying. At the end of this process, the control module 200 would have determined a quantization parameter qp_M used to configure the transformation module 204 to process the group of macroblocks. At step 618, the control module 200 configures the transformation module 204 to process the group of macroblocks with qp_M.

Further, the information output by the prediction module 202 after processing the group of macroblocks may be analyzed and used by the control module 200 to determine other compression parameters. The transformation module 204 processes the group of macroblocks at step 619 according to these compression parameters. The compression parameters may comprise a slice type. For example, the group of macroblocks may be processed according to a first slice type (I, B or P) in the prediction module and later processed in the transformation module according to a second slice type different from the first slice type. The second slice type is determined according to the information output by the prediction module when processing the group of macroblocks. Furthermore, information output by the prediction module 202, the transformation module 204 and the entropy module 208 during the processing of previously encoded portions of pictures may also be used to determine the second slice type.

The processing of the group of macroblocks by the transformation module 204 is improved by using the quantization parameter qp_M instead of the initial quantization parameter qp__1. In other words, the number of bits of the compressed group of macroblocks when processed with qp_M is closer to an allocated number of bits (deducted from the desired bit rate and the compression behavior of previously compressed groups of macroblocks of the same type) than the number of bits of the compressed group of macroblocks when processed with qp__1. During the processing of the group of macroblocks, the transformation module 204 outputs information which may be used during the processing of subsequent groups of macroblocks. For example, the information may be used to determine the set of coefficients representative of a quantization parameter used to configure the prediction module 202 at step 615. The information may also be used to determine a second quantization parameter for processing subsequent groups of macroblocks. For example the information output by the transformation module 204 can be the sum of absolute values of transformed coefficients of a macroblock after the quantization has been applied.

At step 620, the control module 200 may analyze information output by the transformation module 204. Further to this analysis, the control module 200 may request a reprocessing of the group of macroblocks. In this case, the control module 200 may decide to start reprocessing the group of macroblocks at the prediction level (step 615) or at the transformation level (step 618). The information output by the transformation module 204 provides a better estimation of the number of bits necessary to encode the group of macroblocks and allows determining updated compression parameters which achieves a substantially constant bit rate. Further to its reprocessing, the group of macroblocks is finally encoded by the entropy module 208 at step 622. The entropy module 208 outputs, along with encoded data, information related to the encoded data that may be used during compression steps of subsequent macroblocks. For example, the entropy module 208 outputs the number of bits of the encoded group of macroblocks. This number can be used to determine the set of coefficients representative of a quantization parameter used to configure the prediction module 202 at step 615 and/or determine the updated quantization parameter of subsequent groups of macroblocks.

Figure 7:
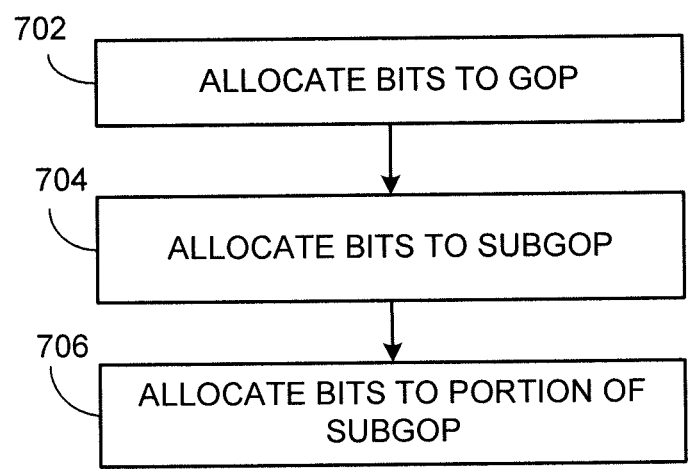
FIG. 7 is a flowchart of an exemplary method for allocating a number of bits to portions of a data stream in accordance with a desired bit rate.

FIG. 7 illustrates exemplary steps as performed by the control module 200 to allocate a number of bits to portions of a data stream in accordance with a desired bit rate. At step 702, the control module 200 allocates for a GOP of the data stream an associated number of bits. At step 704, the control module 200 distributes the GOP's allocated number of bits to its subGOPs. At step 706, the control module 200 distributes each subGOP's allocated number of bits to the portions of picture comprised in the subGOP. A portion of a picture may comprise at least one macroblock, and up to a plurality of groups of macroblocks or slices.

At step 702, the allocated number of bits of a GOP is computed from the target bit rate, the GOP size (in terms of number of pictures) and the data stream's frame rate.

In one embodiment, each GOP of a data stream comprises i subGOPs. At step 704, in order to determine a number of bits to allocate to each subGOP$_i$, the control module 200 computes an associated weight W. Each weight W$_i$ represents the percentage of the GOP's allocated number of bits which should be allocated to subGOP$_i$. This weight is determined according to the performance or efficiency of previously encoded portions of the stream of the same slice type. In one example, the weight of each subGOP$_i$ is W$_i$ such that:

$$W_i = \frac{W_i'}{\sum_{\forall subGOPs} W_k'}$$

Where $$W_i' = \sum_{\forall portions\_of\_subGOP_i} \left( \frac{\text{estimated\_efficiency}_j}{Q_{step\_factor\_j}} \right); Q_{step\_factor\_j} = 2^{qp_j/6};$$

and estimated efficiency is based on the real efficiency of compressing previous portions of the same slice type. In one example, the estimated efficiency of a portion j may be defined as follows:

$$\text{estimated\_efficiency}_j = \begin{cases} \text{Estimated\_efficiency}_1 = \text{Efficiency}_0 \\ \text{Estimated\_efficiency}_j = \frac{\text{Efficiency}_{j-1} + \text{Estimated\_efficiency}_{j-1}}{2} \end{cases}$$

Where efficiency represents the mean number of bits used to compress a macroblock for a given q_step. For example, the efficiency of a portion j may be computed as follows:

$$\text{efficiency}_j = \frac{n_j \times q\_step_j}{nMB}$$

where n$_j$ is the number of bits used to compress the portion j and nMB is the number of macroblocks present in the portion j and q_step$_j$=⅝×2$^{qp/6}$ (where qp is the quantization parameter used in the transformation module 204 when processing portion j. In one embodiment, the efficiency of a portion j is computed once the compression of the portion has been completed in the codec and its corresponding number of bits n$_j$ is output by the entropy module 208. Other efficiency measures may be applicable. Efficiency measures may be used to allocate a bit budget for each portion of a subGOP such that this bit budget is consistent with a substantially constant bit rate.

In one example, if the GOP is standard (i.e. it has an initial subGOP$_0$ structure followed by subGOP$_i$ of the same structure, i>0), only the first and second weights are stored by the codec 102. The weights associated with the following subGOPs (i.e. i>1) are identical to the weight of subGOP$_1$ (since they have the same structure).

At step 706, the control module 200 determines for each portion of a subGOP an associated weight. The weight W$_j$ represents the percentage of the subGOP's bits that should be allocated to portion j and is used to determine the number of bits allocated to a portion.

$$W_j = \frac{W'_j}{\sum_{\forall portion in subGOP} W'_k}$$

Where $$W'_j = \frac{\text{estimated\_efficiency}_j}{\text{q\_step\_factor}_j}.$$

In one embodiment, the GOP's bit allocation is performed when the codec 102 starts processing each GOP, while the subGOP bit allocation is performed only when the codec 102 starts processing the subGOP. Further, a GOP's structure may change during the compression of the data stream and this may affect the allocated number of bits per GOP. This change is taken into account since the allocated number of bits is computed for each GOP when the codec starts its compression.

Referring back to FIG. 6 at step 616, the prediction module 104 processes a group of macroblocks according to initial compression parameters. The group of macroblock is a portion of a subGOP. In this embodiment, the compression parameters include a set of coefficients representative of an initial quantization parameter qp_1. For example, the set of coefficients may be a plurality of quantization parameter offsets and biases which may vary according to the type and size of a macroblock. In addition, some coefficients may be used to determine the cost of the motion vector difference of a macroblock. These coefficients may also vary according to the macroblock's type and size.

Once the portion has been processed in the prediction module 202, a set of statistics relative to the prediction of the portion with qp_1 is output. The statistics are generated in the different units of the prediction module 202. For example, the intra prediction unit 304 generates statistics associated with the intra prediction of each macroblock. The inter prediction unit 306 generates statistics associated with the inter prediction of each macroblock. In addition, the selection module 302 generates statistics associated with the processed portion. In one example, the prediction module 202 outputs for the portion a statistic $$\text{STAT\_PRED} = \sum_{mb} (SAD_{mb} + \text{cost\_evaluation}_{mb});$$

where $$SAD_{mb} = \sum |\text{Residual}|$$

and cost_evaluation$_{mb}$ is a predicted number of bits for the prediction parameters associated with the macroblock (such as macroblock type, motion vector, reference index etc.). In one embodiment, the statistic is sent directly to the control module 200 and do not go through the memory by an output module (not shown in FIG. 6). In another embodiment, the statistic is stored in memory 104 and retrieved by the control module 200 when needed.

Figure 8:
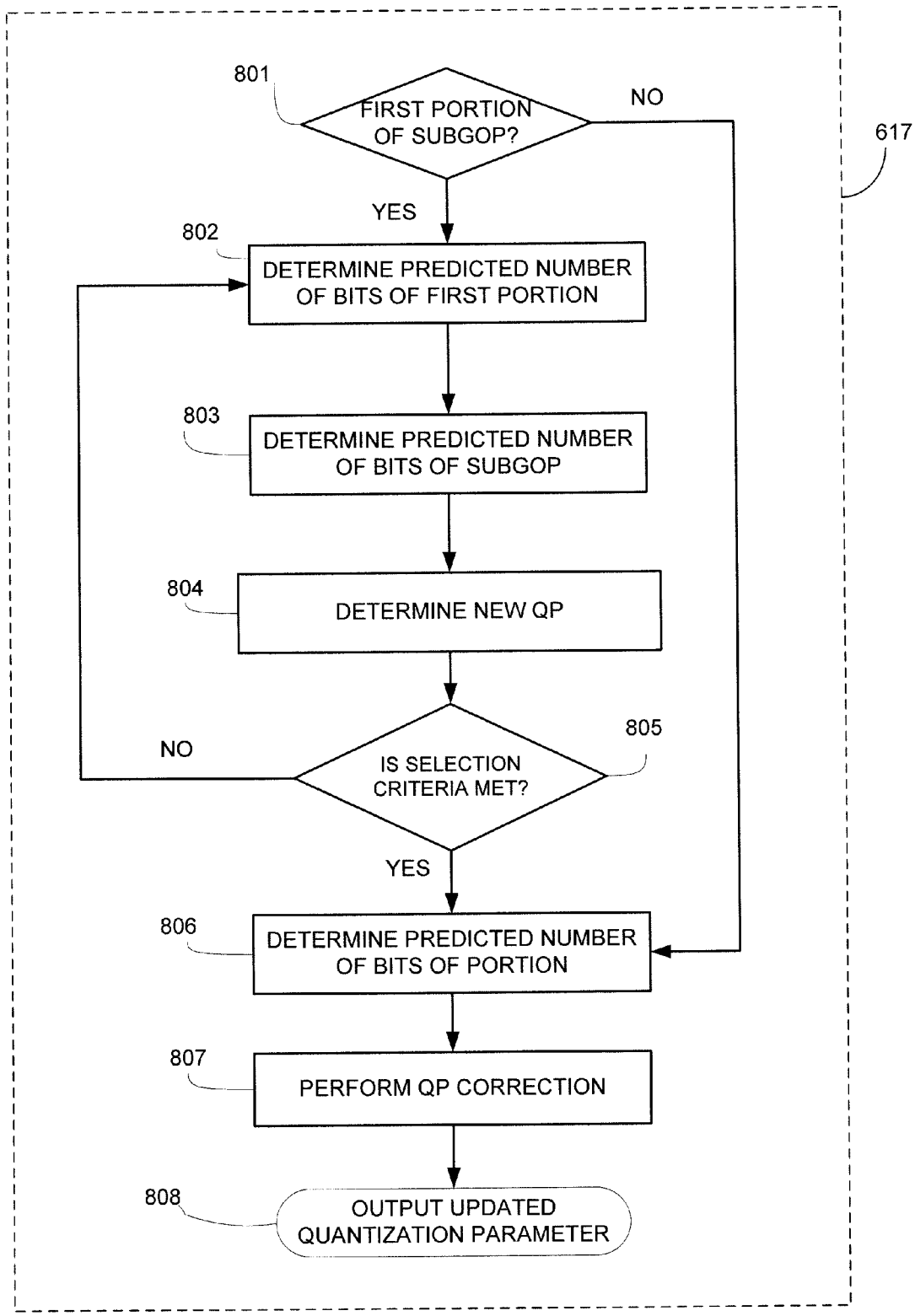
FIG. 8 is a flowchart of an exemplary method for determining an updated quantization parameter.

At step 617, the control module 200 analyzes the statistic output by the prediction module 202 and generates updated compression parameters. FIG. 8 illustrates an exemplary process for analyzing information and generating updated compression parameters 617. In a first step 801, the control module 200 determines if the processed portion is the first portion of the subGOP. If the portion is the first then the process moves to perform steps 802, 803, 804, 805 until a selection criteria is met for the new quantization parameter determined in these steps. When the selection criteria is met then the steps 806 and 807 are performed before outputting an updated quantization parameter at step 808. If the portion is not the first portion of the subGOP the process performs steps 806 and 807 before outputting an updated quantization parameter at step 808.

At step 802, a predicted number of bits needed to compress the first portion of the subGOP in the codec 102 is determined. At step 803, a predicted number of bits for compressing the entire subGOP is determined at least in part according to the predicted number of bits of the first portion. At step 804, a new quantization parameter is determined partly from the predicted number of bits of the subGOP. At step 805, the control module 200 determines if the new quantization parameter meets the selection criteria. If the new quantization parameter meets the selection criteria then the number of bits for compressing the first portion is estimated according to the new quantization parameter at step 806 and a correction is performed on the new quantization parameter at step 807. The corrected quantization parameter is output at step 808 and is used as the updated quantization parameter. If the selection criteria are not met at step 805, the steps 802, 803 and 804 are repeated for the first portion until the new quantization parameter meets the selection criteria.

In one example, at step 802 the control module 200 determines the predicted number of bits Nbit$_1$ necessary for the compression of the first portion of the subGOP according to a given quantization parameter. More specifically according to a given q_step$_1$. Nbit$_1$ is determined according to the statistics STAT_Pred$_1$ output by the prediction module 202 after processing the first portion and according to the relationship between the statistics of previously encoded portions of the same slice type and the quantization parameter used to compress them. For example, the number of bits may be predicted as follows:

$$Nbit_1 = \frac{\text{STAT\_PRED}_1}{\text{q\_step} \times EstimatedR_1};$$

where q_step$_1$=⅝($2^{(qp\_1)/6}$), qp_1 is a function of the latest base qp and a plurality of qp offsets, and EstimatedR$_1$ which is estimated for the first portion from the relationship $$R_j = \frac{\text{STAT\_PRED}_j}{\text{q\_step}_j \times n_j}$$

between previously encoded portions of the same type at the same position and the number of bits used to compress them at a corresponding q_step$_j$. In particular, STAT_PRED$_j$ is the statistic output by the prediction module 202 when processing a portion j, q_step$_j$ is derived from the quantization parameter used to compress the portion j in the transformation module 204, n$_j$ is the number of bits used to compress the portion j in the codec 102 and {portion$_j$} is the set of all processed portions of the same slice type at the same position.

At step 803, the control module 200 further determines a predicted number of bits for compressing the subGOP$_i$ based in part on the predicted number of bits of the first portion. In one example, the predicted number of bits of the subGOP$_i$ is $$NbitsubGOP_i = Nbit_1 + \sum_{\forall remaining portions in subGOP}^{j} \frac{X_i \times NumberMacroblocksofportion_j}{q\_step_j};$$

where $$\sum_{\forall remaining portions in subGOP}^{j} \frac{X_i \times NumberMacroblocksofportion_j}{q\_step_j}$$

is an estimation of the number of bits necessary to compress the remaining portions of the subGOP$_i$ (excluding the first portion) based on an estimation of the number of bits necessary to compress a macroblock at a given q_step. In particular $X_i$ may be determined as follows:

$$X_i = \frac{\sum_{\forall all remaining portions}^{j} Efficiency_j}{Number of remaining portions}.$$

Once the predicted number of bits for compressing the subGOP$_i$ is determined at step 803, the control module determines at step 804 a new base quantization parameter in part based on the predicted number of bits for the subGOP$_i$. An iterative scheme is used to determine a new base quantization parameter such that it minimizes the difference between the predicted numbers of bits used to compress subGOP$_i$ and the number of bits that were allocated for this subGOP. In one example, the iterative scheme minimizes a bit bucket function which is the sum of allocated bits of all subGOPs of the data stream preceding subGOP$_i$ minus the compression bits effectively used by the preceding subGOPs and the predicted number of bits needed to compress subGOP$_i$. In order to minimize the bit bucket function, the quantization parameter and consequently q_step are varied and the steps 802, 803 and 804 are repeated with the varying q_step until the bit bucket function is minimized i.e. until the selection criteria of the new quantization parameter is met. In some embodiments, at step 805, the control module 202 not only verifies that the bit bucket function is minimized but may also use other criteria such as the difference between the latest base qp and the new base qp is lower than a given value before selecting the new quantization parameter.

The latest base quantization parameter is used to determine a predicted number of bits of the first portion at step 806 and is corrected at step 807 as described in more detail below. Similarly if the portion processed in the prediction module 202 is not the first portion of a subGOP then steps 806 and 807 are performed and the steps 802, 803, 804 and 805 are skipped for this portion.

At step 806 the predicted number of bits of the portion is predicted according to the statistics STAT_Pred$_1$ output by the prediction module 202 after processing the portion and according to the relationship between the statistics of previously encoded portions of the same slice type and the quantization parameter used to compress them. For example, the number of bits may be predicted as follows:

$$Nbit_1 = \frac{STAT\_Pred_1}{q\_step_{new} \times EstimatedR_1}$$

where $q\_step_{new} = \frac{5}{8}(2^{(qp\_new)/6})$, qp_new is a function of the latest base qp and a plurality of qp offsets and EstimatedR$_1$ which is estimated for the first portion from the relationship $$R_j = \frac{STAT\_PRED_j}{q\_step_j \times n_j}$$

between previously encoded portions of the same type at the same position and the number of bits used to compress them at a corresponding q_step$_j$. In particular, STAT_PRED$_j$ is the statistic output by the prediction module 202 when processing a portion j, q_step$_j$ is derived from the quantization parameter used to compress the portion j in the transformation module 204, n$_j$ is the number of bits used to compress the portion j in the codec 102 and {portion$_j$} is the set of all processed portions of the same slice type at the same position.

At step 807 a correction is performed on the new quantization parameter qp_new. More specifically at step 806 a qp_correction is computed such that if added to qp_new it forms the updated quantization parameter output at step 808. qp_correction is deducted from a ratio of an estimated number of bits used for the compression of the subGOP's portions until and including the currently processed portion versus the number of bits allocated to the portions of the subGOP until and including the currently processed portion. In particular, the qp_correction is deducted from the ratio:

$$\frac{\sum_{portionsofsubGOP}^{k<j} n_k + Nbit_j}{\sum_{portionsofsubGOP}^{k \leq j} allocatedBit_k};$$

where Nbit$_j$ is the predicted number of bits for compressing the current portion j according to qp_new, n$_k$ is the number of bits used to compress a portion k such that portion k precedes portion j in the subGOP$_i$. In some embodiments, the ratio may be modified by a tensor parameter (a value between 0 and 1) which will reduce the distance between the ratio and 1 and consequently reduce the prediction error effect on qp_correction. The final ratio is then treated like a product of qp offset (a factor of the final q step) and a qp difference δqp is computed using the formula 6*log(final ratio)/log(2). In some embodiment, this δqp may be clamped between the value −2 and 2 in order to minimize the variation in compression quality between portions of the same slice type. In this embodiment, the δqp may be added to a qp correction accumulator that is reset to 0 at the start of a subGOP and that is clamped between the values −6 and 6. Finally the qp_correction_accumulator is added to the new qp and output as an updated quantization parameter at step 808.

The updated quantization parameter qp_2 is then used at step 618 to configure the transformation module 204 for processing the portion j when the reprocessing of the portion is not necessary and the updated quantization parameter meets the selection criteria. In some embodiments, qp_2 satisfies the selection criteria if the difference between qp_2 and qp_1 is within a predetermined interval.

The codec 102 may be configured to analyze data for configuring a transformation module 204 at the end of the processing of each group of macroblocks of a stream. In some other embodiments, the codec 102 analyzes data for configuration of the transformation module 204 with appropriate parameters every N groups of macroblocks of the stream, N group of macroblocks defining a portion of a picture. In these embodiments, the analysis is not performed at the end of the processing of each group of macroblocks by the prediction module 202 or the transformation module 204 but the analysis is done only after a plurality of groups. In these embodiments, the analysis may be done according to information gathered from the plurality of groups of macroblocks. For example statistics on each one of the N groups of macroblocks are combined to estimate the size of encoded data. In general, the codec 102 may be configured and controlled through a firmware or software component. This component may determine if the analysis of data should be done at each group of macroblocks or every N groups of macroblocks. The steps described in FIG. 6 may be used to allow the codec 102 to compress a stream of image data at a controlled bit rate.

The architecture of the codec as illustrated in FIG. 2 allows certain steps of the compression process to occur in parallel and allows the performance (or efficiency) of some modules to be decoupled from the performance of other modules. For example, the entropy module 208 may read data from the memory 104 independently of the processing performed by the transformation module 206. The architecture of the codec as illustrated in FIG. 2 may be configured to compress image data and/or to decompress encoded bit streams.

The codec 102 as described above and shown in FIG. 2 may also comprise additional components (not shown), such as a filtering module, a display module, an output module, and an input module. For example, the filtering module may be used to filter a picture or a stream of image data before being processed by the prediction module 202. The filtering module may also be used to remove noise from a picture before the different compression steps are performed on the picture. The display module may be used to output an uncompressed video stream stored in the memory 104 to a display monitor at a given display rate. The output module may be used to output compressed or uncompressed image data to processing modules external to the codec 102. The input module may be used to receive uncompressed image data from an external source such as a video camera. The input module may also receive compressed image data. The different modules of the codec 102 are connected to the memory 104 through the memory interface 210.

According to some embodiments, the different modules present in codec 102 may be duplicated in order to speed up the processing of data and provide better performances to the codec 102 when implemented in a chip. For example, the codec 102 may comprise many instances of the entropy module 208, and/or many instances of the transformation module 204 and the prediction module 202. According to other embodiments, the entropy module 208 of the codec 102 may comprise a plurality of sub-modules, each module performing a compression or decompression type. For example, the entropy module 208 may comprise a CABAC encode module and a CABAC decode module, a CAVLC encode module and a CAVL decode module. In another example, the entropy module 208 includes a plurality of instances of the CABAC decode module, a CAVLC encode module, a CAVLC decode module along with a CABAC encode module. In general the entropy module 208 may comprise a plurality of the same sub-module and other sub-modules.

In some embodiments, the codec 102 may be configured to process a plurality of independent streams simultaneously. For example, the prediction module 202 may be configured to process a first group of macroblocks of a first stream while the transformation module 204 is configured to process a first group of macroblocks of a second stream. At any given time, the processing occurring in a module is independent from the processing of the other modules. Consequently the task and the data processed in the different modules are independent. For example, a prediction module 202 can be configured to perform the compression steps of a first group of macroblocks while the entropy module 208 is performing decompression tasks of a second stream.

In some of the embodiments described above, the modules included in the codec 102 are described as register-based engines. The register-based engines may be double or multi-buffered. In other embodiments, one or more of the modules may be implemented as command-based engines receiving commands and data and performing the tasks as described above.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. Furthermore, the data paths may be communication paths, communication links, data buses, and any other type of connection allow the transfer of data. For example, in some embodiments, a data path may represent a plurality of communication buses. The data paths may be bi-directional or uni-directional and may carry instructions, commands, handshake signals, requests and/or control information. Additional data paths to those shown in the figures may also be provided between the various components of the system 100. The structure illustrated is thus provided for efficiency of teaching the present embodiment.

It should be noted that the present invention can be carried out as a method and can be embodied in a system or on a computer readable medium. The embodiments of the invention described above are intended to be exemplary only. The scope of the invention is therefore intended to be limited solely by the scope of the appended claims.

The invention claimed is:

1. A method for compressing a data stream with a compression device comprising at least a first module and a second module, the method comprising:
    receiving a request to compress a group of macroblocks of the data stream;
    configuring the first module in accordance with initial compression parameters and requesting that the first module process the group of macroblocks;
    receiving an output of the first module comprising information related to the group of macroblocks as processed by the first module;
    analyzing the information related to the group of macroblocks and determining updated compression parameters in accordance therewith; and
    configuring the second module with the updated compression parameters and requesting that the second module process the group of macroblocks when the analysis of the information related to the group of macroblocks meets a selection criteria.

2. The method of claim 1, further comprising reconfiguring the first module in accordance with the updated compression parameters and requesting that the first module reprocess the group of macroblocks when the analysis of the information related to the group of macroblocks does not meet the selection criteria.

3. The method of claim 1, further comprising:
receiving an output of the second module comprising information related to the group of macroblocks as processed by the second module;
analyzing the information related to the group of macroblocks as processed by the second module and determining further updated compression parameters in accordance therewith;
reconfiguring one of the first module and the second module in accordance with the updated compression parameters and requesting that the one of the first module and the second module reprocess the group of macroblocks when the analysis of the information related to the group of macroblocks does not meet a second selection criteria; and
completing the compression of the group of macroblocks in a third module when the analysis of the information related to the group of macroblocks as processed by the second module meets the second selection criteria.

4. The method of claim 1, wherein the updated compression parameters correspond to the initial compression parameters.

5. The method of claim 1, wherein analyzing the information related to the group of macroblocks comprises analyzing a set of statistics to predict a number of bits necessary to encode the group of macroblocks.

6. The method of claim 5, further comprising allocating bits to the group of macroblocks for encoding in accordance with a desired bit rate.

7. The method of claim 1, wherein the first module is a prediction module that outputs a prediction for the group of macroblocks in addition to the information related to the group of macroblocks, and the second module comprises a transformation module that transforms and quantizes the group of macroblocks.

8. The method of claim 3, wherein the first module is prediction module that outputs a prediction for the group of macroblocks in addition to the information related to the group of macroblocks, the second module is a transformation module that transforms and quantizes the group of macroblocks, and the third module is an entropy module that performs lossless compression on the transformed and quantized group of macroblocks.

9. The method of claim 1, wherein the updated compression parameters comprise an updated quantization parameter.

10. The method of claim 1, wherein the selection criteria corresponds to a quantization parameter difference.

11. A compression device for compressing a data stream comprising:
a first module for performing a first part of a compression scheme;
a second module for performing a second part of the compression scheme; and
a control module operatively connected to the first module and the second module and adapted for:
(a) receiving a request to compress a group of macroblocks of the data stream;
(b) configuring the first module in accordance with initial compression parameters and requesting that the first module process the group of macroblocks;
(c) receiving an output of the first module comprising information related to the group of macroblocks as processed by the first module;
(d) analyzing the information related to the group of macroblocks and determining updated compression parameters in accordance therewith; and
(f) configuring the second module with the updated compression parameters and requesting that the second module process the group of macroblocks when the analysis of the information related to the group of macroblocks meets a selection criteria.

12. The device of claim 11, wherein the control module is further adapted for reconfiguring the first module in accordance with the updated compression parameters and requesting that the first module reprocess the group of macroblocks when the analysis of the information related to the group of macroblocks does not meet the selection criteria.

13. The device of claim 11, further comprising a third module for performing a third part of the compression scheme, and wherein the control module is further adapted for:
(h) receiving an output of the second module comprising information related to the group of macroblocks as processed by the second module;
(i) analyzing the information related to the group of macroblocks as processed by the second module and determining further updated compression parameters in accordance therewith;
(j) reconfiguring one of the first module and the second module in accordance with the updated compression parameters and requesting that the one of the first module and the second module reprocess the group of macroblocks when the analysis of the information related to the group of macroblocks does not meet the selection criteria; and
(k) completing the compression of the group of macroblocks in the third module when the analysis of the information related to the group of macroblocks as processed by the second module meets the selection criteria.

14. The device of claim 13, wherein the control module is further adapted for repeating (h) to (j) until the selection criteria is met.

15. The device of claim 11, wherein the updated compression parameters correspond to the initial compression parameters.

16. The device of claim 13, wherein the further updated compression parameters correspond to the updated compression parameters.

17. The device of claim 11, wherein the first module is a prediction module that outputs a prediction for the group of macroblocks in addition to the information related to the group of macroblocks, and the second module comprises a transformation module that transforms and quantizes the group of macroblocks.

18. The device of claim 13, wherein the first module is a prediction module that outputs a prediction for the group of macroblocks in addition to the information related to the group of macroblocks, the second module is a transformation module that transforms and quantizes the group of macroblocks, and the third module is an entropy module that performs lossless compression on the transformed and quantized group of macroblocks.

19. The device of claim 11, wherein the selection criteria corresponds to a quantization parameter difference.

* * * * *

UNITED STATES PATENT AND TRADEMARK OFFICE
CERTIFICATE OF CORRECTION

PATENT NO. : 9,047,669 B1  Page 1 of 1
APPLICATION NO. : 13/623557
DATED : June 2, 2015
INVENTOR(S) : Jean-Jacques Ostiguy et al.

It is certified that error appears in the above-identified patent and that said Letters Patent is hereby corrected as shown below:

In the Specification

The formula in column 12 at line 50 should read:

$$Nbit_1 = \frac{STAT\_PRED_1}{q\_step_1 \times EstimatedR_1} ;$$

Signed and Sealed this
Sixth Day of October, 2015

Michelle K. Lee
*Director of the United States Patent and Trademark Office*